(12) United States Patent
Detlefs

(10) Patent No.: US 7,043,509 B2
(45) Date of Patent: May 9, 2006

(54) PARALLEL NON-CONTIGUOUS ALLOCATION AND CARD PARSING

(75) Inventor: David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 511 days.

(21) Appl. No.: 10/368,970

(22) Filed: Feb. 19, 2003

(65) Prior Publication Data

US 2004/0162861 A1 Aug. 19, 2004

(51) Int. Cl.
G06F 17/30 (2006.01)

(52) U.S. Cl. ...................... 707/206; 711/148
(58) Field of Classification Search ............... 707/101, 707/200, 205, 206; 711/148
See application file for complete search history.

(56) References Cited

U.S. PATENT DOCUMENTS

| | | | |
|---|---|---|---|
| 5,903,900 A * | 5/1999 | Knippel et al. ............. | 707/206 |
| 6,098,080 A | 8/2000 | Endicott et al. | |
| 6,148,310 A | 11/2000 | Azagury et al. | |
| 6,212,608 B1 * | 4/2001 | Bak ........................... | 711/152 |
| 6,434,577 B1 * | 8/2002 | Garthwaite ................. | 707/206 |
| 6,539,464 B1 * | 3/2003 | Getov ......................... | 711/170 |
| 6,658,652 B1 * | 12/2003 | Alexander et al. .......... | 717/128 |
| 6,684,392 B1 * | 1/2004 | Eidt ........................... | 717/148 |
| 2004/0111445 A1 | 6/2004 | Garthwaite et al. | |

OTHER PUBLICATIONS

UNKNOWN, "Numbers and Their Application—Lesson 17—Logarithmic Properties", http://www.andrews.edu~calkins/math/webtexts/numb17.htm, Nov. 7, 2005.

* cited by examiner

Primary Examiner—Leslie Wong
Assistant Examiner—Robert M. Timblin
(74) Attorney, Agent, or Firm—Kudirka & Jobse, LLP

(57) ABSTRACT

A garbage collector operates in multiple threads, and one thread can be parsing a region containing a free block while another thread is allocating space from that free block for an object being relocated to that region. The object being relocated may be an array object, for which the length determination is based on more than one word in the object; it may be based on a class-identifying word and a number-of-elements word. To prevent a parsing thread from parsing erroneously by reading both of those words between the relocating thread's writing one of them and writing the other, the relocating thread first writes into the classifying word a distinguished value from which a parsing thread can conclude that the values it reads in other fields of the block are not to be trusted. The relocating thread then completes writing the other fields before it writes the relocated object's classifying word, and any parsing thread repeats the size-determining routine until the uninitialized value is removed and it can therefore rely on other values in the block.

22 Claims, 11 Drawing Sheets

PARALLEL NON-CONTIGUOUS ALLOCATION AND CARD PARSING

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class.

The invention to be described below is applicable to systems that allocate memory to objects "dynamically." Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data and instructions for operating on them that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices such as communications interface 16 through a system bus 17. The memory space made available to an application program may be "virtual" in the sense that it can actually be considerably larger than RAM 14 provides. So the RAM contents will be swapped to and from a system disk 18.

Additionally, the physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 18 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Memory leaks and dangling references often result from a programmer's using interfaces like malloc( )/free( ) to manage dynamically allocated memory explicitly.

A way of reducing the likelihood of such errors is automatically to provide techniques of memory-space reclamation that are more systematic. Such techniques are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a systematic way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 18 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code.

In one approach to garbage collection, the compiler 20, without the programmer's explicit direction, additionally generates code that automatically reclaims unreachable memory space. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3. FIG. 3 depicts an example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted by electromagnetic signals to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. In either case, the interpreted or compiled code is provided to a runtime system 30, which in conjunction with the operating system 31, executes the program.

Those skilled in that art will recognize that both of these organizations are merely exemplary, and many modem systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps.

In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the heap, although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in a basic root set 52. The basic root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before fore the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. Most new objects are allocated in a "young" generation, and older objects are promoted from younger generations to older generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generation 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references may have been written since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). For example, when the mutator writes reference 70 in card 72, it makes an entry 69 in the location associated with card 72 in card table 64.

The entries made by most write-barrier implementations simply indicate that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Although there is no reason in principle to favor any particular number of generation, and although FIG. 6 shows three, most generational garbage collectors have only two generations, of which one is the young generation and the other is the old generation. Moreover, although FIG. 6 shows the generations as being of the same size, a more-typical configuration is for the young generation to be considerably smaller.

As was mentioned above, a collector uses the card-table entries to tell it what cards have had references modified in them since the last time the collector updated its lists of where references to objects in various groups are located. The card table typically identifies the cards in which references have been modified, but it does not tell where within the card any of the references are. So the collector will normally maintain for each card some information from which the collector can find where some object starts that is relatively near to that card. From that object's location, the collector can find a data structure containing that object's class information, usually including its length and the offsets of references within it, and it can infer from the object's length information where the next object starts. By thus finding successive objects' locations, the collector parses the card into objects.

Unfortunately, this description of parsing is somewhat oversimplified, since it implies that each object begins at the end of the previous object, i.e., that objects are contiguous. Although objects may initially be allocated contiguously, some collectors reclaim unreachable objects' space in such a fashion that the remaining reachable objects are no longer contiguous. As will flow be explained, though, memory space can be parsed readily in such systems if the resultant free blocks between objects are treated in a manner similar to that in which objects are treated.

Consider the object layout that FIG. 7 depicts. In that drawing, reference numeral 90 refers to an object format that an implementation of the Java virtual machine could employ. We assume that the object begins with a header and that the first word 92 in that header contains the pointer to the object's class information, although not all class pointers are so located. We also assume that objects, including structures containing object' class information, are, say, four-byte aligned. That is, the least-significant two bits in the address of an object or class-information structure will be $00_2$. So word 92's two least-significant bits 94 are ordinarily $00_2$. As was mentioned above, the information that can be found by following the class pointer will indicate what the object's size is. In the case of the Java virtual machine, some objects are "normal" objects, and other objects are arrays. The class information for a normal object gives the size information by itself. In the case of an array, the class information indicates what the size of an individual array element is, and some object field, such as structure 90's third word 96, indicates how many such elements there are. To ascertain the length of an array-type object, that is, the collector has to read two of the objects' words, namely, its class pointer and its number-of-elements word.

As was mentioned above, the memory space that follows the object or array may be a free block rather than an object or array. But free blocks themselves contain length information in some systems. For example, consider free block 98. If, instead of being a free block, that structure were an object or array, then its first word 100 would in the illustrated system be a pointer to class information, and its two least-significant bits 102 would have the value $00_2$. To distinguish a free block 98 from an object or array, those least-significant are given a value different from $00_2$. In the illustrated embodiment, they are given the value $01_2$. As was mentioned above, an object's class pointer need not be located in the object's first word. Whatever offset is used for an object's class pointer, though, will also be used for the word in which a free block is tagged as such. We will refer to the word that contains the class pointer or the free-block-indicating tag as the classifying word.

The collector maintains one or more lists of free blocks. For example, free blocks may be connected in a doubly linked list. The first two words 100 and 104, for instance, may be forward and backward pointers. (As objects are, free blocks are at least four-byte aligned in the example, so the collector masks out the two least-significant bits in order to obtain a proper pointer to the next free block.) To find the end of the free block, the collector reads, say, the third word 106 in the block, which gives the free block's size. So reclaiming a memory block in this example involves giving it such a free-block-representing header. And parsing memory space containing such free blocks can be relatively straightforward.

But a problem can arise in systems in which the collector is executed in multiple threads. To appreciate this, let us consider a specific example, in which the heap is divided, as FIG. 8 illustrates, into two generations, a small, "young" generation 110, in which most objects are placed upon initial allocation, and a much larger, "old" generation 112, into which objects from the young generation are relocated, or promoted, when they have proved themselves to be long-lived by remaining potentially reachable for a relatively long time.

For the sake of example, we will assume a collection interval that occurs after a mutator interval in which objects newly allocated in the young generation 110 have been allocated in its upper semi-space 114. For present purposes, we will assume a collection interval that includes collection of only the young generation 110. In that young-generation collection, all objects in semi-space 114 that are found to be reachable or potentially so are relocated. In some cases, they are relocated to semi-space 116. But a tally is kept of how many times each young-generation object has thus been relocated within the young generation. If that tally indicates that a certain object has already been relocated some maximum number of times, it is promoted into the old generation.

As was explained above, objects within the young generation are identified as being reachable or potentially so if they are referred to by a reference in the basic root set 118 or by a reference in a young-generation object that itself has been identified as potentially reachable. Since the collection operation considered here is restricted to collection of the young generation 110, no determination is made during that operation as to whether any objects in the old generation are potentially reachable. Conservatively, therefore, the collector considers a young-generation object to be potentially reachable if it is referred to by any reference in the old generation.

To identify all young-generation objects thus referred to, the collector employs multiple threads concurrently to search respective portions of the old generation for references to young-generation objects. To this end, each thread may, for example, be allocated a respective set of entries in a card table 120. As was mentioned above, a card table can be employed to indicate where references have been modified between collection intervals. As those skilled in the art recognize, though, a card table can be used at the same time to keep track of where all references in the old generation are located that refer to young-generation objects. Each thread reads the entries in the group of card-table entries assigned to it and determines whether the associated card needs to be scanned for references to young-generation objects.

In many cases, the entry will indicate that the associated card need not be scanned. But some will indicate the need for scanning. When this happens, the thread will refer to some structure not shown, such as a card-object table, by which it can find the location of an object near to the card to be scanned. Usually, the information for a given card will tell where to find the object in which the card begins. The thread will then find the references by parsing the card in the manner described above.

When it finds a reference, it determines whether the reference refers to a young-generation object. If so, it relocates that object, often to the other semi-space 116, as was mentioned above. As was also mentioned above, though, it may instead promote the object into the old generation. To this end, it may, say, refer to a free-list head, not shown, that points to the first free block in a linked list of such blocks. Suppose, for instance, that the list head points to the starting address of FIG. 9's free block 124. The thread will write over an initial free-block portion that is long enough to hold the object being promoted. FIG. 10 depicts the result. Specifically, a new object 126 has been placed at the beginning of the first free block, and appropriate values are written into succeeding locations in that block to result in a shorter remaining free block 128. Specifically, block 128's pointer fields 130 receive the values that free block 124's pointer fields 132 (FIG. 9) contained, and its length field 134 receives a value equal to the difference between the contents of block 124's length field 136 and the length of the promoted object 126.

We are now ready to observe the difficulty that multi-threaded collection causes in this context. Suppose that, while the promoting thread is writing the promoted object into an old-generation card, another thread is parsing that card in order to find references. If the parsing thread reads block 124's classifying word 138, including its free-block-indicating tag 140, it concludes, correctly, that the block is a free block. Although it does not need to scan the free block for references, of course, it does need to determine where the next block begins, so it proceeds to read the contents of the length field 136. But suppose that the promoting thread writes the promoted object into that space between the time at which the parsing object reads the classifier word 138 and the time at which it reads the (erstwhile) length field 136. The value that the parsing thread reads as a result will not in general give the length of the (now-shortened) block 126. This is true even in the case that FIG. 10 illustrates, in which the promoted object 126 is an array and the contents written into word 136 therefore indicate how many array elements the array contains.

The result is therefore undesirably indeterminate. For example, suppose that, interpreted as a length, the new contents of field 136 indicate that the block ends just before word 142. The parsing thread will interpret the contents of that word as a pointer to classifying information and the parsing thread will therefore parse the card erroneously.

SUMMARY OF THE INVENTION

I have developed a way of avoiding such interference in multi-threaded collectors. In accordance with the invention, a thread that allocates space for an object in a previously free block writes into the classifying word before it changes the contents of the block's length field. And a parsing thread that has inferred from a classifying word's contents that the block containing that word is a free block re-reads that classifying word after it has read the block's length field. If the contents of the classifying word still indicate that the block is free, the parsing thread can safely conclude that no allocating thread has interfered with its parsing operation.

To deal with problems that can arise when the classifying word has changed, though, the invention includes a further feature, one that is based on a third block state. As was mentioned above, a block can have a free state or an occupied state. In addition to these two states, embodiments that employ this aspect of the invention provide a third, "unintialized" state. At least in the case of a thread that is allocating space for an array or some other type of object whose length determination requires reading more than one of its words, the value placed by that thread into the classifying word at the beginning of the operation is one, which we will call unintialized, that identifies the block as being in the third state. That value could, for example, be NULL. In this third state, the block is recognized as being neither free nor yet occupied. After the thread has placed the proper value into each other field—such as an array object's number-of-elements field—that needs to be read in order to ascertain the object's length, it changes the classifying word to the value that identifies the object or array class.

This solves a problem that could otherwise arise when space for an array or similar object is being allocated. If an allocating thread instead placed the class pointer into the classifying word initially, before it wrote the proper value of the array's number-of-elements field, the parsing thread could read the classifying word that identifies the block as containing an array but then read the number-of-elements field before the allocating thread placed the proper value into it. This would result in a parsing error and potentially disastrous consequences.

BRIEF DESCRIPTION OF THE DRAWINGS

The invention description below refers to the accompanying drawings, of which.

DETAILED DESCRIPTION OF AN ILLUSTRATIVE EMBODIMENT

Figure 11:
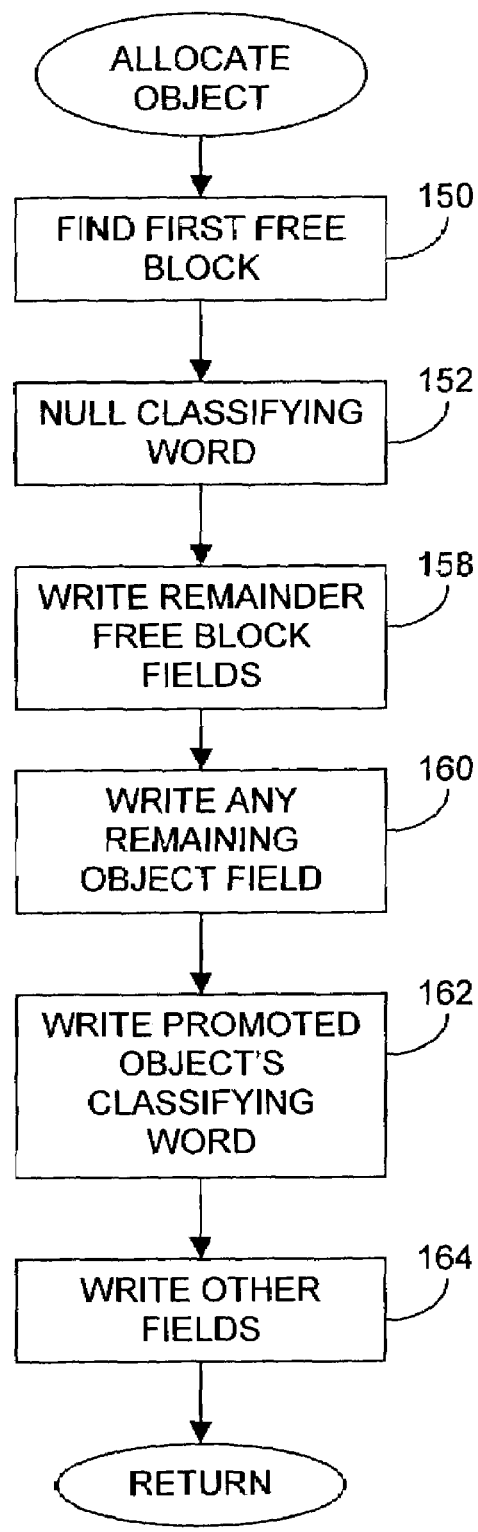
FIG. 11 is a flow chart that depicts an object-allocating routine of a type that can be used by an embodiment of the present invention.

FIG. 11 is a flow chart that depicts a routine that the illustrated embodiment employs to allocate an object in the old generation. As block 150 indicates, the thread begins by finding a free block in the old generation. As was mentioned above, it may refer to a free-list head for this purpose. The particular manner in which the free list is kept is not of importance in the present invention's context, so we will assume for the sake of simplicity that each thread has its own free list and thereby avoids collision with other allocating threads. As those skilled in the art will recognize, of course, common free lists can be employed instead, and appropriate synchronization mechanisms can be used to avoid collisions.

Figures 9, 10:
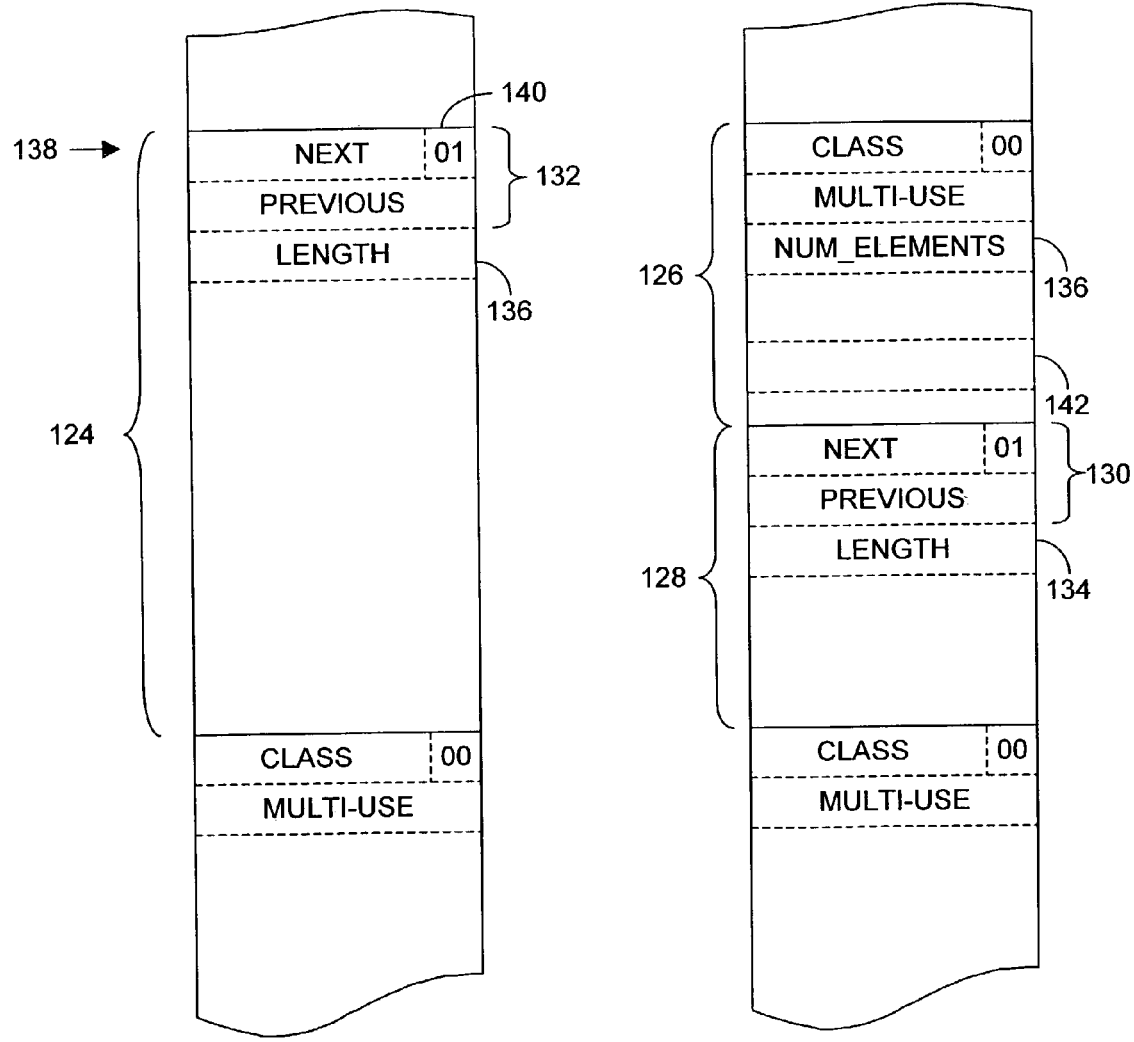
FIG. 9, discussed above, is diagram of a free block and a subsequent object-occupied block.
FIG. 10, discussed above, is a diagram depicting the result of allocating space from that free block.
Figure 12:
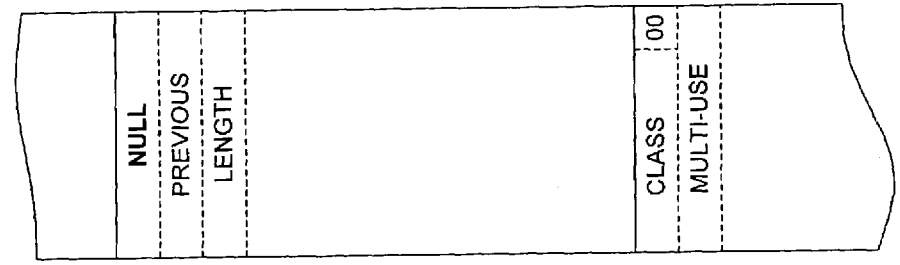
FIG. 12 is a diagram of the result of performing one of that routine's operations.

In any event, the allocating thread gives the classifying word of the free block thereby found a distinguished value that other threads will interpret as indicating that the block is in an intermediate state, as will be explained in more detail below. As was mentioned above, we will call this value uninitialized. It may, for instance, be NULL. Block 152 represents performing this step, and FIG. 12 depicts the result of performing it in the context that FIG. 9 illustrates.

Figure 14:
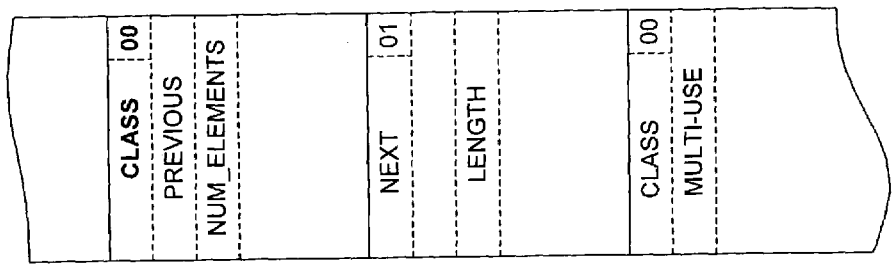
FIG. 14 is a diagram of the result of performing yet another of that routine's operations.
Figure 13:
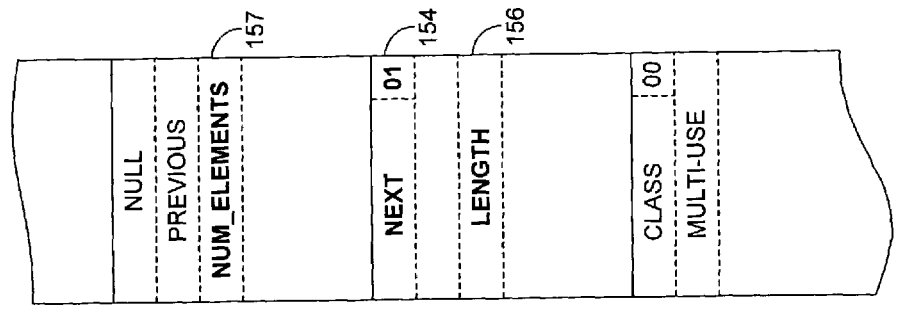
FIG. 13 is a diagram of the result of performing another of that routine's operations.

With the block thus tagged as being in an intermediate state, the promoting thread proceeds to write other fields before it places the promoted object's class pointer into its classifying word. In some embodiments, the promoting thread will write all of the other fields before it writes the promoted object's classifying word, but other embodiments may write the class pointer after only selected ones of those fields have been written. The promoting thread will write at least the remainder free block's classifying and length words (FIG. 13's words 154 and 156). In the case of the Java virtual machine, the promoting thread will also write the promoted object's number-of-elements field 157 if the promoted object is of the array type. For the sake of example, FIG. 11's blocks 158 and 160 represent writing only those fields, and block 162 represents thereafter writing the new classifier word, with the result that FIG. 14 depicts. As was stated above, some embodiments will write all of an object's fields before writing the object's classifying word. But FIG. 11 includes block 164 to represent writing any fields that have not been thus written. This completes the operation and results in the state that FIG. 10 depicts.

Figure 15:
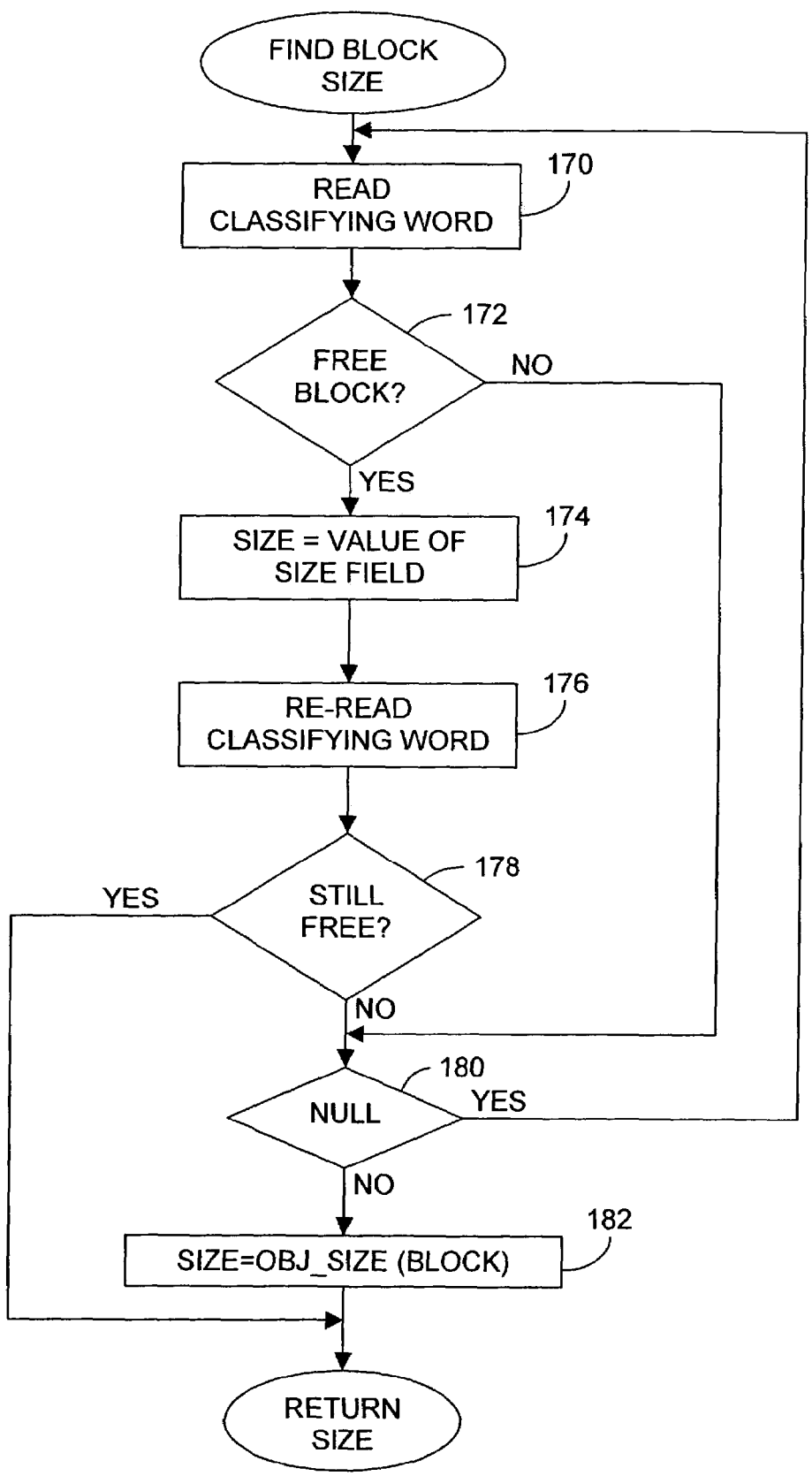
FIG. 15 is a flow chart of a routine that an embodiment of the present invention can use to find the size of a memory block.

To appreciate the benefit of allocating promoted objects in this fashion, consider FIG. 15, which is a flow chart of a routine that can be used by a card-parsing thread to find the size of a block. As FIG. 15's block 170 indicates, the parsing thread first reads the memory block's classifying word. As block 172 indicates, it inspects that word's least-significant bits to determine whether the block is a free block. If it is, the size of the block is indicated by the value of its size field, so the thread reads that value, as block 174 indicates. The thread then re-reads the classifying word, as block 176 indicates. As block 178 indicates, it tests that word to see whether it has changed since it was read in the step represented by block 170. If not, the thread has read the correct length of the free block, so the size-determining routine returns that value, as the drawing indicates.

If the block-178 test indicates that the classifying word has changed, on the other hand, the parsing thread tests that word's current value, as block 180 indicates, to determine whether the classifying word has been given the uninitialized value. If it has, the promoting thread "spins": it starts the size-finding routine over again.

It is at this point that the reason for employing the uninitialized value becomes apparent. Imagine removing the block-180 step and having the routine spin in response to a negative outcome of the block-178 step instead of to an affirmative outcome of the block-180 step. That is, suppose that the thread simply spun upon finding that the classifying word had changed value. This time, the outcome of the block-172 test would be negative: the classifying word would no longer indicate that the block is free, and, in the absence of the block-180 test for the uninitialized value, the thread would proceed to the block-182 operation of extracting the block size in the way appropriate to normal or array-type objects. If the promoting thread began the promoting operation by writing the promoted object's classifying word instead of writing the uninitialized value, the parsing thread could reach the remainder free block's classifying-word and/or length fields before those fields had received their proper values.

Now, this problem could be dealt with in the case of a normal object by instead having the promoting thread write the remainder-free-block fields before writing the promoted object's classifying word. If the promoted object is instead of the array type, though, the parsing thread, after reading the promoted object's classifying word correctly in the block-170 step, could end up obtaining the wrong size from the block-182 size-determining step if the promoting thread has not yet written the proper value into the number-of-elements field. By having the promoting thread begin by writing the uninitialized value and by having the parsing thread check for that value, the collector avoids this untoward result; the parsing thread will spin until the uninitialized value is gone and the thread can thereby conclude that the values on which it bases the size determination are correct.

Parsing errors are not the only type of errors that the use of the uninitialized value can prevent. To appreciate this, consider the fact that a thread that promotes an object into a card may do so after the thread that was responsible for that card has already finished scanning it. The promoting thread must be responsible for seeing that the references contained in the newly promoted thread are themselves scanned. True, promotions into a card by promoting threads may instead occur before that card's scanning thread ever reaches it. Since the promoting threads will not in general know whether scanning has yet been completed for the cards in which they are promoting objects, though, they scan the references in the promoted objects independently of whether the cards into which they are promoting the objects have already been scanned. So, to avoid unnecessary work, a scanning thread may restrict its scanning to objects that have not been promoted during the current collection into the card being scanned.

Figure 1:
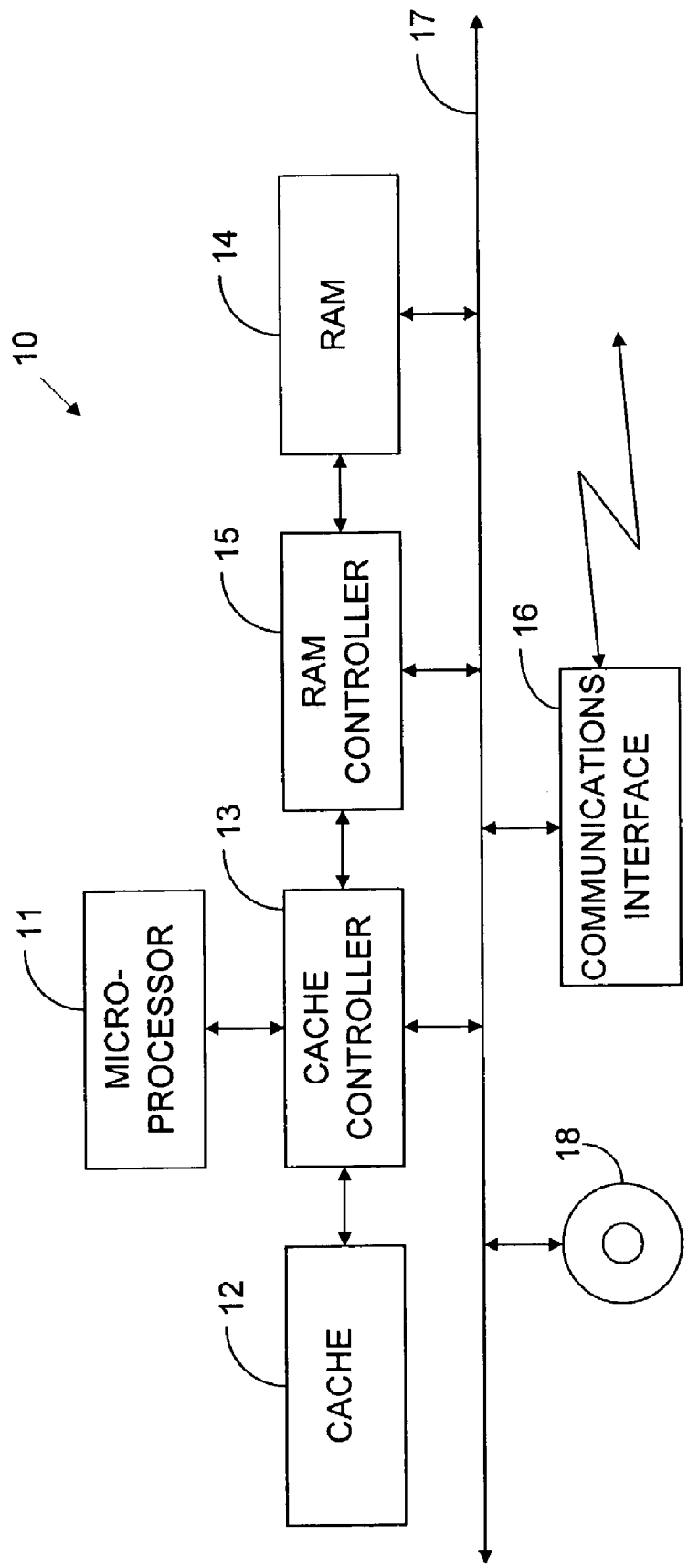
FIG. 1, discussed above, is a block diagram of a computer system in which the present invention's teachings can be practiced.
Figure 2:
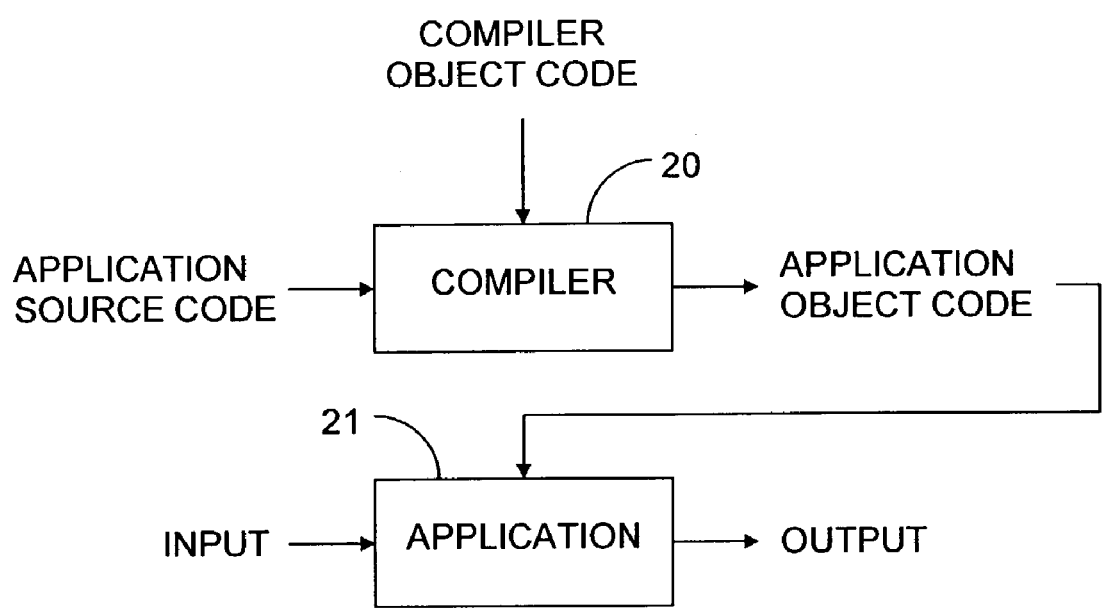
FIG. 2 as, discussed above, is a block diagram that illustrates a compiler's basic functions.
Figure 3:
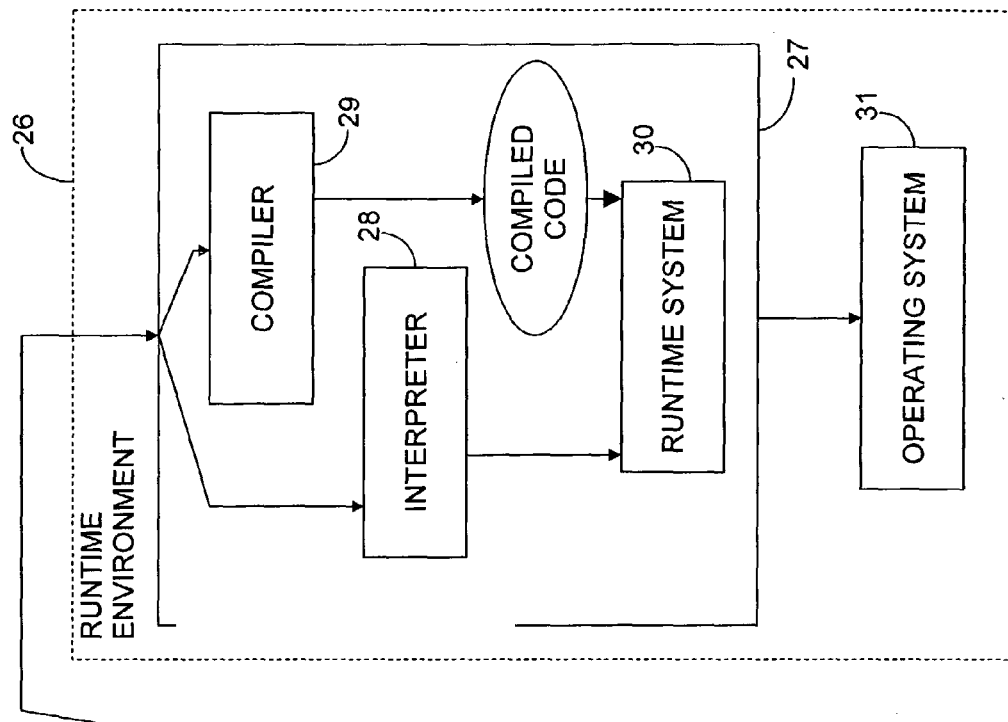
FIG. 3, discussed above, is a block diagram that illustrates a more-complicated compiler/interpreter organization.
Figure 3:
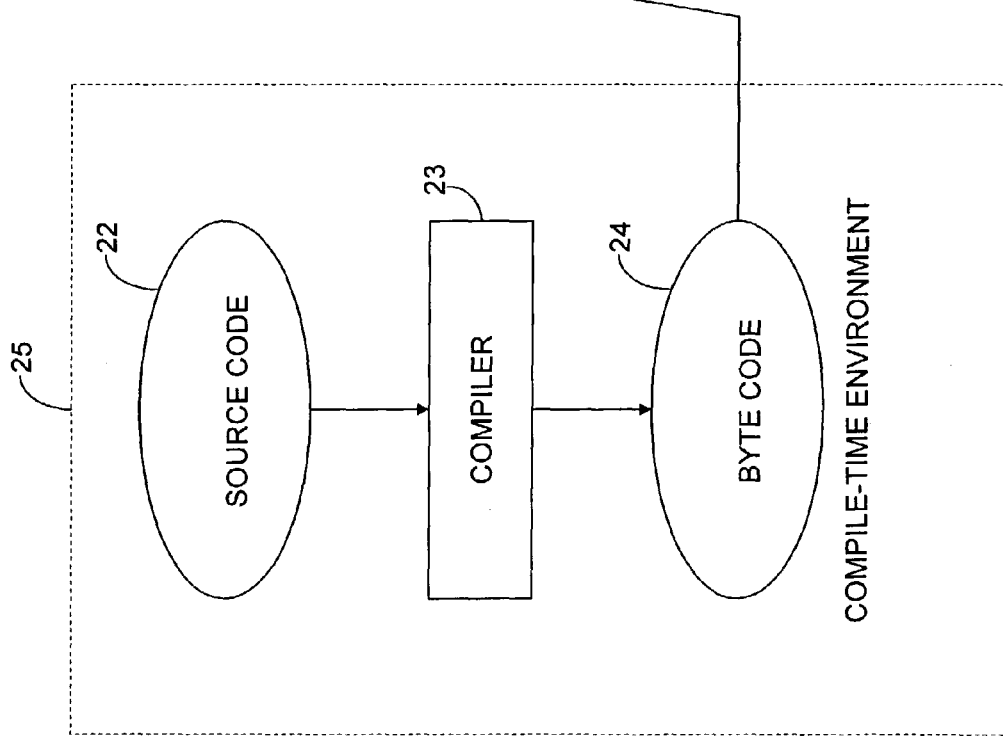
Figure 4:
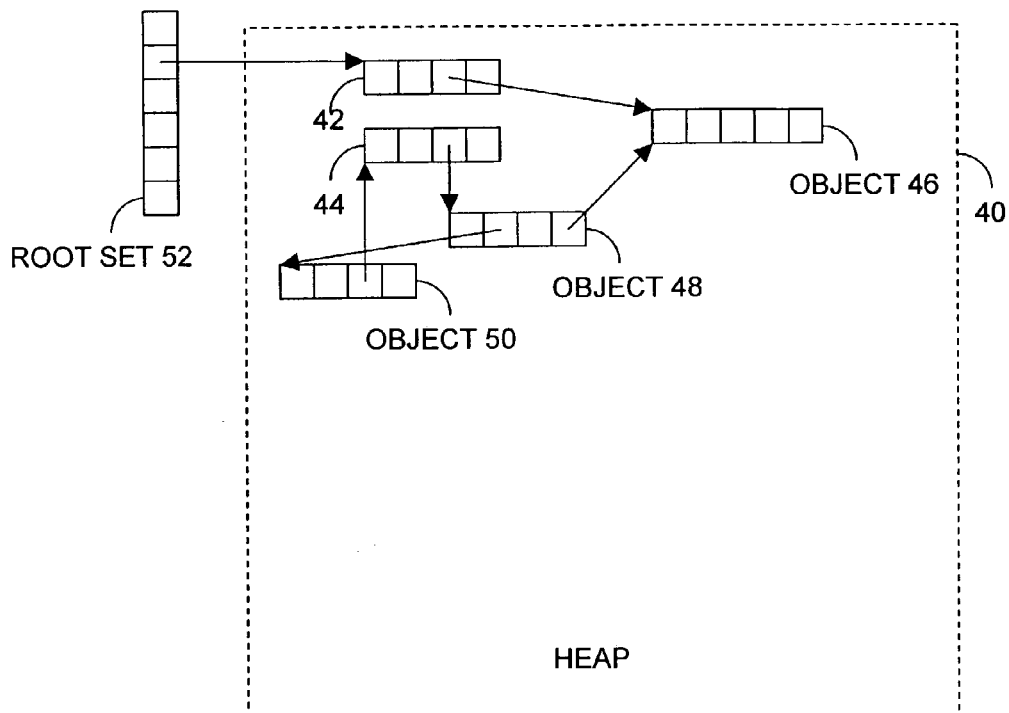
FIG. 4, discussed above, is a diagram that illustrates a basic garbage-collection mechanism.
Figure 5:
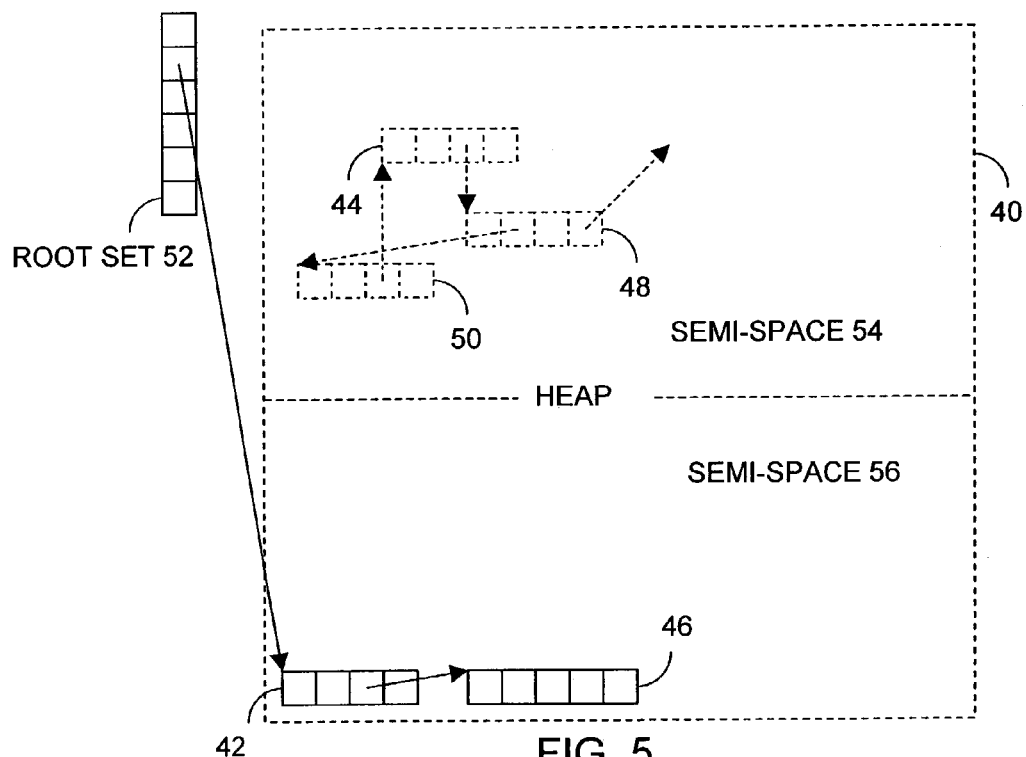
FIG. 5, discussed above, is a similar diagram illustrating that garbage-collection approach's relocation operation.
Figure 6:
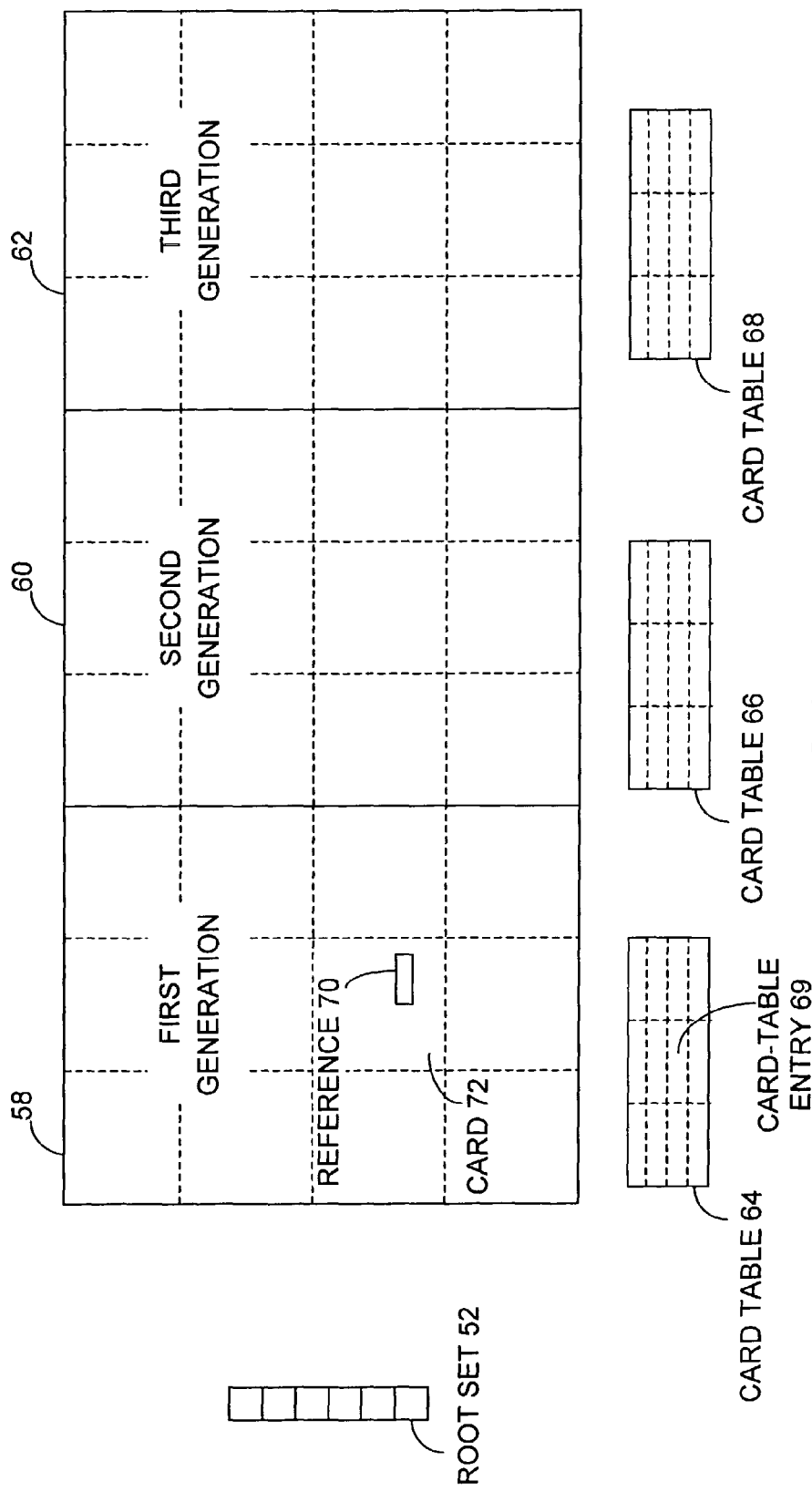
FIG. 6, discussed above, is a diagram that illustrates a garbage-collected heap's organization into generations.
Figure 7:
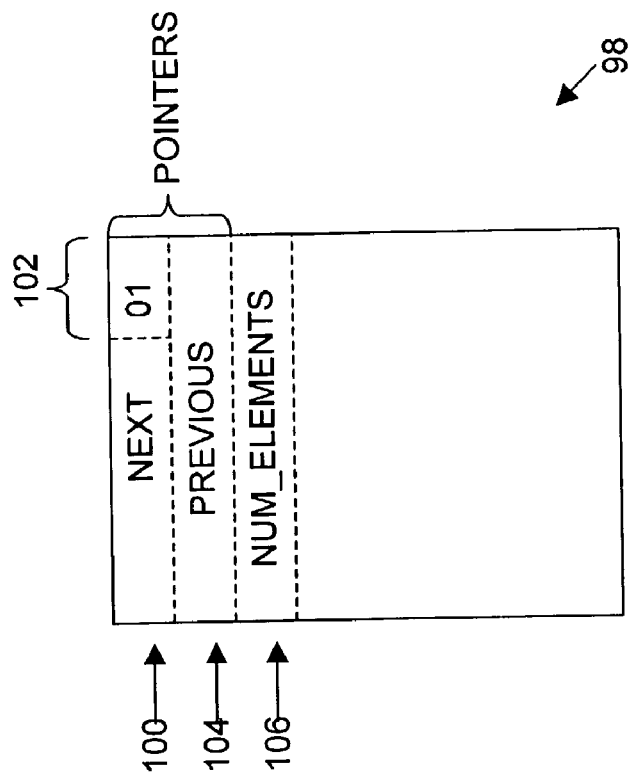
FIG. 7, discussed above, is a data-structure diagram illustrating object-containing and free memory blocks.
Figure 7:
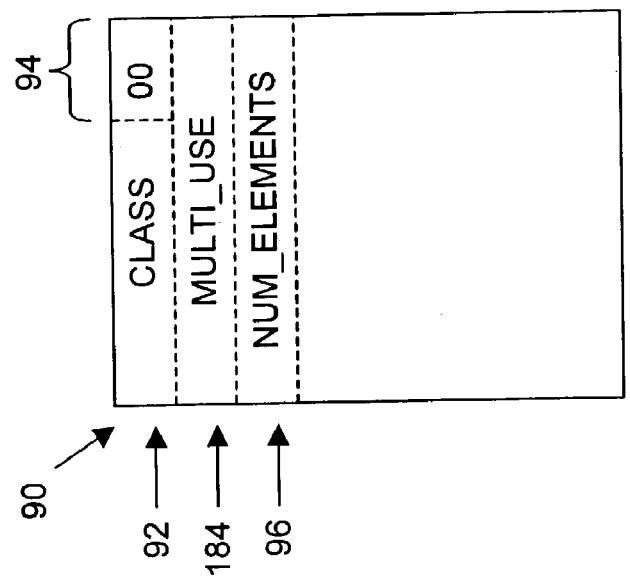
Figure 8:
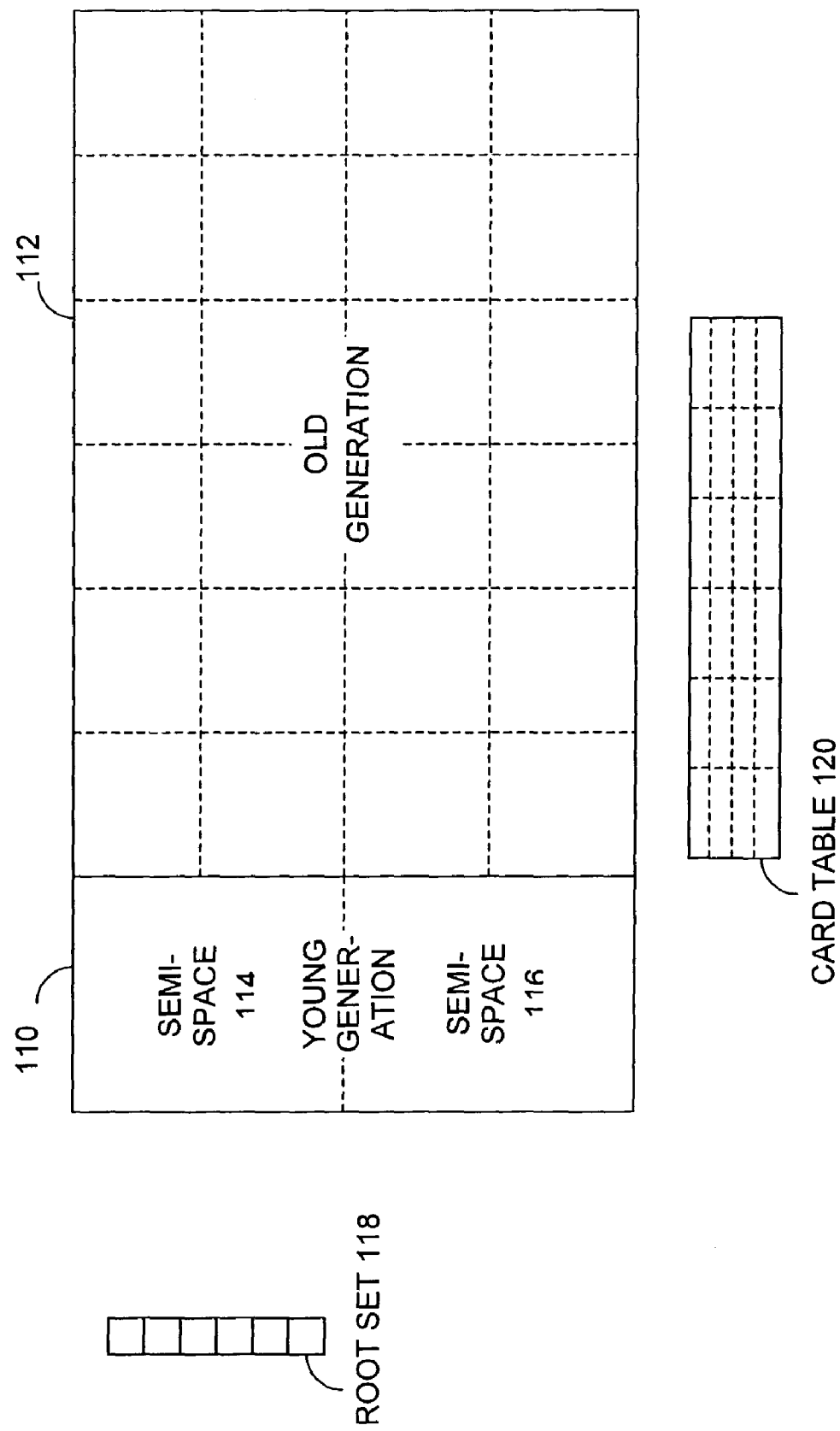
FIG. 8, discussed above, is a diagram of a two-generation heap organization.

One might therefore conclude that in such a system there is no harm in writing the promoted object's reference fields after the promoted object's classifying word is written over the uninitialized value. I.e., if the promoted object's references are written in the operation that FIG. 11's block 164 represents, the scanning thread will not be reading those references, anyway. To enable scanning threads to distinguish newly promoted objects from others, though, the promoting threads must mark them as such, possibly by writing an appropriate code in, say, the multi-use field identified in FIG. 7 by reference numeral 184. If the promoting thread does not write that value into the block before it writes the object's class pointer over the uninitialized value, a scanning thread could misinterpret the block as containing a pre-existing object, and it could read reference fields before the proper reference values are placed there. This is among the reasons why some embodiments will write all of an object's fields before writing the object's class pointer over the uninitialized value.

In short, the present invention can be employed to eliminate a wide variety of problems presented by multi-threaded garbage-collector implementations. It therefore constitutes a significant advance in the art.

What is claimed is:

1. A method of garbage collection comprising:
    A) providing a computer system that includes memory and executes a mutator that modifies references in a dynamically allocated heap in the memory;
    B) configuring the computer system to act as a garbage collector that executes in a plurality of threads in such a manner that:
        i) a first, scanning one of the threads can be performing a parsing operation in which the scanning thread parses memory space into memory blocks of which each includes a classifying word while a second, allocating one of the threads is performing an allocation operation for allocating, from a free block that is being parsed by the scanning thread and includes a length word, memory space to an object belonging to a class the length of each instance of which is ascertainable only by reading more than one word of that instance;
        ii) at least when the allocation operation is being performed for an object that is an instance of a class the length of each instance of which is ascertainable only by reading more than one word of that instance, the allocation operation for allocating memory space from a given free block for a given object comprises:
            a) placing an uninitialized-indicating value in the given block's classifying word;
            b) thereafter writing at least one word of the object in another field of the given free block; and
            c) thereafter replacing the uninitialized-indicating value by updating that classifying word in accordance with the class to which the object belongs; and
        iii) the scanning operation for a given block comprises:
            a) reading a classification value from the given block's classifying word; and
            b) performing a length-determination operation that:
                (1) if the classification value indicates that the given block contains an object, comprises employing class information located through the given block's classifying word to determine the length of the given block;
                (2) if the classification value is the uninitialized-indicating value, comprises:
                    (a) re-reading the given block's classifying word; and (b) repeating the length-determination operation for the given block; and (3) if the classification value indicates that the given block is a free block, comprises:

(a) reading a provisional length value from the given block's length field;

(b) re-reading the given block's classifying word to determine whether the classifying value has changed;

(c) if it has, repeating the length-determination operation for the given block; and (d) otherwise adopting the provisional length value as the length of the given block; and C) employing the computer system to execute the garbage collector.

2. A method as defined in claim 1 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

3. A method as defined in claim 1 wherein the allocation operation includes over-writing the free block's length word with contents of the object only after the uninitialized-indicating value has been placed in the free block's classifying word.

4. A method as defined in claim 3 wherein the allocation operation includes writing fields of a remainder free block out of the given free block before replacing the uninitialized-indicating value.

5. A method as defined in claim 3 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

6. A method as defined in claim 1 wherein the allocation operation includes writing all of the object's fields other than its classifying word after placing an uninitialized-indicating value in the given block's classifying word but before replacing the uninitialized-indicating value with the object's classifying word.

7. A method as defined in claim 1 wherein the allocation operation includes writing fields of a remainder free block out of the given free block before replacing the uninitialized-indicating value.

8. A method of garbage collection comprising:

A) processor circuitry operable to execute processor instructions; and

B) memory circuitry, to which the processor circuitry is responsive, that includes a heap in which memory space is dynamically allocated and that contains processor instructions readable by the processor circuitry to configure the computer system as a mutator that modifies references in the heap and as a garbage collector that executes in a plurality of threads in such a manner that i) a first, scanning one of the threads can be performing a parsing operation in which the scanning thread parses memory space into memory blocks of which each includes a classifying word while a second, allocating one of the threads is performing an allocation operation for allocating, from a free block that is being parsed by the scanning thread and includes a length word, memory space to an object belonging to a class the length of each instance of which is ascertainable only by reading more than one word of that instance;

ii) at least when the allocation operation is being performed for an object that is an instance of a class the length of each instance of which is ascertainable only by reading more than one word of that instance, the allocation operation for allocating memory space from a given free block for a given object comprises:

a) placing an uninitialized-indicating value in the given block's classifying word;

b) thereafter writing at least one word of the object in another field of the given free block; and c) thereafter replacing the uninitialized-indicating value by up-dating that classifying word in accordance with the class to which the object belongs; and iii) the scanning operation for a given block comprises:

a) reading a classification value from the given block's classifying word; and b) performing a length-determination operation that:

(1) if the classification value indicates that the given block contains an object, comprises employing class information located through the given block's classifying word to determine the length of the given block;

(2) if the classification value is the uninitialized-indicating value, comprises:

(a) re-reading the given block's classifying word; and (b) repeating the length-determination operation for the given block; and (3) if the classification value indicates that the given block is a free block, comprises:

(a) reading a provisional length value from the given block's length field;

(b) re-reading the given block's classifying word to determine whether the classifying value has changed;

(c) if it has, repeating the length-determination operation for the given block; and (d) otherwise adopting the provisional length value as the length of the given block.

9. A computer system as defined in claim 8 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

10. A computer system as defined in claim 8 wherein the allocation operation includes overwriting the free block's length word with contents of the object only after the uninitialized-indicating value has been placed in the free block's classifying word.

11. A computer system as defined in claim 10 wherein the allocation operation includes writing fields of a remainder free block out of the given free block before replacing the uninitialized-indicating value.

12. A computer system as defined in claim 10 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

13. A computer system as defined in claim 8 wherein the allocation operation includes writing all of the object's fields other than its classifying word after placing an uninitialized-indicating value in the given block's classifying word but before replacing the uninitialized-indicating value with the object's classifying word.

14. A computer system as defined in claim 8 wherein the allocation operation includes writing fields of a remainder free block out of the given free block before replacing the uninitialized-indicating value.

15. A storage medium containing instructions that, when read by a computer system that includes memory and executes a mutator that modifies references in a dynamically allocated heap in the memory, cause the computer system to operate as a garbage collector that executes in a plurality of threads in such a manner that:
   A) a first, scanning one of the threads can be performing a parsing operation in which the scanning thread parses memory space into memory blocks of which each includes a classifying word while a second, allocating one of the threads is performing an allocation operation for allocating, from a free block that is being parsed by the scanning thread and includes a length word, memory space to an object belonging to a class the length of each instance of which is ascertainable only by reading more than one word of that instance;
   B) at least when the allocation operation is being performed for an object that is an instance of a class the length of each instance of which is ascertainable only by reading more than one word of that instance, the allocation operation for allocating memory space from a given free block for a given object comprises:
      i) placing an uninitialized-indicating value in the given block's classifying word;
      ii) thereafter writing at least one word of the object in another field of the given free block; and
      iii) thereafter replacing the uninitialized-indicating value by updating that classifying word in accordance with the class to which the object belongs; and
   C) the scanning operation for a given block comprises:
      i) reading a classification value from the given block's classifying word; and
      ii) performing a length-determination operation that:
         a) if the classification value indicates that the given block contains an object, comprises employing class information located through the given block's classifying word to determine the length of the given block;
         b) if the classification value is the uninitialized-indicating value, comprises:
            (1) re-reading the given block's classifying word; and
            (2) repeating the length-determination operation for the given block; and
         c) if the classification value indicates that the given block is a free block, comprises:
            (1) reading a provisional length value from the given block's length field;
            (2) re-reading the given block's classifying word to determine whether the classifying value has changed;
            (3) if it has, repeating the length-determination operation for the given block; and
            (4) otherwise adopting the provisional length value as the length of the given block.

16. A storage medium as defined in claim 15 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

17. A storage medium as defined in claim 15 wherein the allocation operation includes overwriting the free block's length word with contents of the object only after the uninitialized-indicating value has been placed in the free block's classifying word.

18. A storage medium as defined in claim 17 wherein the allocation operation includes writing fields of a remainder free block out of the given free block before replacing the uninitialized-indicating value.

19. A storage medium as defined in claim 17 wherein the allocation operation for allocating memory space from a given free block for a given object comprises placing an uninitialized-indicating value in the given block's classifying word independently of whether the given object is an instance of a class the length of each instance of which is ascertainable only by reading more than one word of that instance.

20. A storage medium as defined in claim 15 wherein the allocation operation includes writing all of the object's fields other than its classifying word after placing an uninitialized-indicating value in the given block's classifying word but before replacing the uninitialized-indicating value with the object's classifying word.

21. A storage medium as defined in claim 15 wherein the allocation operation includes writing fields of a remainder free block out of the given free block before replacing the uninitialized-indicating value.

22. A garbage collector that operates in the memory of a computer system and executes in a plurality of threads and includes:
   A) means for employing a first, scanning one of the plurality of threads to perform a parsing operation in which the scanning thread parses memory space into memory blocks of which each includes a classifying word, the scanning operation for a given block comprising:
      i) reading a classification value from the given block's classifying word; and
      ii) performing a length-determination operation that:
         a) if the classification value indicates that the given block contains an object, comprises employing class information located through the given block's classifying word to determine the length of the given block;
         b) if the classification value is an uninitialized-indicating value, comprises:
            (1) re-reading the given block's classifying word; and
            (2) repeating the length-determination operation for the given block; and
         c) if the classification value indicates that the given block is a free block, comprises:
            (1) reading a provisional length value from the given block's length field;
            (2) re-reading the given block's classifying word to determine whether the classifying value has changed;
            (3) if it has, repeating the length-determination operation for the given block; and
            (4) otherwise adopting the provisional length value as the length of the given block; and B) means for concurrently employing a second, allocating one of the threads to performing an allocation operation for allocating, from a free block that is being parsed by the scanning thread and includes a length word, memory space to an object belonging to a class the length of each instance of which is ascertainable only by reading more than one word of that instance, the allocation operation for allocating memory space from a given free block for a given object comprising:

i) placing the uninitialized-indicating value in the given block's classifying word;
ii) thereafter writing at least one word of the object in another field of the given free block; and
iii) thereafter replacing the uninitialized-indicating value by updating that classifying word in accordance with the class to which the object belongs.

* * * * *